July 3, 1951 F. J. D. TAYLOR ET AL 2,558,886

TRANSMISSION EFFICIENCY TESTED BY MODULATING CARRIER WITH LOW-FREQUENCY AND MEASURING LOW-FREQUENCY MODULATION COMPONENT

Filed Oct. 20, 1947

Inventors:-
Frederic John Dunn Taylor,
David Gordon Tucker,
By
Pierce, Scheffler & Parker,
Attorneys.

Patented July 3, 1951

2,558,886

UNITED STATES PATENT OFFICE 2,558,886

TRANSMISSION EFFICIENCY TESTED BY MODULATING CARRIER WITH LOW-FREQUENCY AND MEASURING LOW-FREQUENCY MODULATION COMPONENT

Frederick John Dunn Taylor, Wembley Park, and David Gordon Tucker, Amersham, England Application October 20, 1947, Serial No. 780,900
In Great Britain November 1, 1946

4 Claims. (Cl. 179—175.3)

This invention relates to apparatus of the kind adapted for the testing, measuring and/or control of electric transmission in carrier wave systems of the single or multichannel type.

Such apparatus is used, for example, to effect measurements on the transmission at some part of the system to determine the power level relative to a datum level, to make tests on the transmission to ensure that there is no fault in the system up to the part at which the test is made, or to effect a control by switching in auxiliary apparatus when transmission fails or by varying the gain according to the measurements of the power level.

In communication systems of the carrier wave type, it is frequently desired to make transmission measurements or the like whilst the system is in operation, and it is obvious that such measurements should be made without interference to or from the communication channels. In suppressed carrier systems measurement can be made at the frequency of the suppressed carrier, but such an arrangement has the disadvantage that carrier leak may interfere with measurement.

The present invention has for its object to provide a measuring or control apparatus which can be used in a carrier wave system without interference, and according to the invention use is made of a modulated carrier wave which can be transmitted between adjacent channels, and control or measurement is made on only the modulation component.

In electric communication systems, particularly those involving wire circuits, it is desirable to obtain as many channels as possible in the available frequency spectrum, and there is accordingly a wide use of carrier wave systems of the suppressed carrier single side band type. In such systems, the voice or other intelligence signals to be transmitted are modulated, directly or indirectly, upon carrier waves, the frequencies of which are spaced in the available spectrum by little more than the highest voice frequency to be transmitted. In each channel one of the two side bands produced by modulation is selected and transmitted, the carrier wave being suppressed usually by use of a balanced modulator.

Objects of the present invention are to provide multiple channel carrier wave systems which may be checked as to transmission characteristics without interference with the normal transmission of signals on all channels. An object is to provide a multiple channel carrier wave system of the single side band type in which test signals of frequencies which fall within an inter-channel gap are transmitted, the test signals being developed by modulating a carrier wave of one of the channel frequencies with a signal of a frequency well below the minimum frequency of message signal transmission.

These and other objects and the advantages of the invention will be apparent from the following specification when taken with the accompanying drawing, in which.

Figure 1:
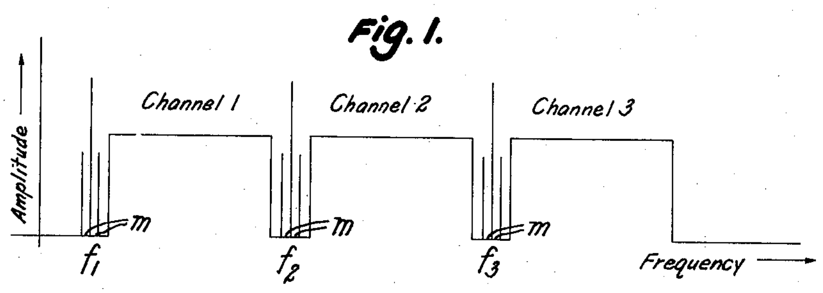
Fig. 1 is a frequency spectrum diagram showing the relative locations of message channels and testing channels in a multiple channel carrier wave system embodying the invention.

The resulting frequency spectrum is indicated in idealised form in Figure 1 of the accompanying drawing. In this figure the channels 1, 2 and 3 are shown as adjacently spaced in the available frequency spectrum, and are transmitted as single side bands—here indicated as the upper side bands—of carrier frequencies $f_1$, $f_2$ and $f_3$. For various well known reasons, the side bands are not contiguous, and there exists between them gaps, containing the carrier frequencies $f_1$, $f_2$, $f_3$ and these gaps enable measurements to be made upon the system without interfering with the intelligence signal side band. The measurements can, therefore, be made at, or very near, the carrier frequencies.

Owing to imperfections of balance of the modulators and/or filters which may be employed there is frequently in practice a carrier leak, and any such leak will affect any measurements or control which may be made at such carrier frequencies. Even if the measurements are made at frequencies differing slightly from the carrier frequencies $f_1$, $f_2$, $f_3$, the carrier leak will be extremely difficult to eliminate.

With the present invention, measurements or control functions are performed by modulating the carrier frequency by a test signal the frequency of which is sufficiently low for the side bands to be accommodated in the gap between the adjacent channels. The measurements or control is then effected by the modulation component of the transmitted test signal, and the presence or absence of a carrier or carrier leak will have little or no effect upon the measurement or control apparatus.

Thus, in Figure 1, signals of carrier wave frequencies are modulated by test signals of frequency *m* to produce upper and lower side bands in well known manner.

On reception, the test signals are filtered out and are demodulated, and the measurements are made upon the modulation component either directly or after further processes of amplification or rectification if desired.

Figure 2:
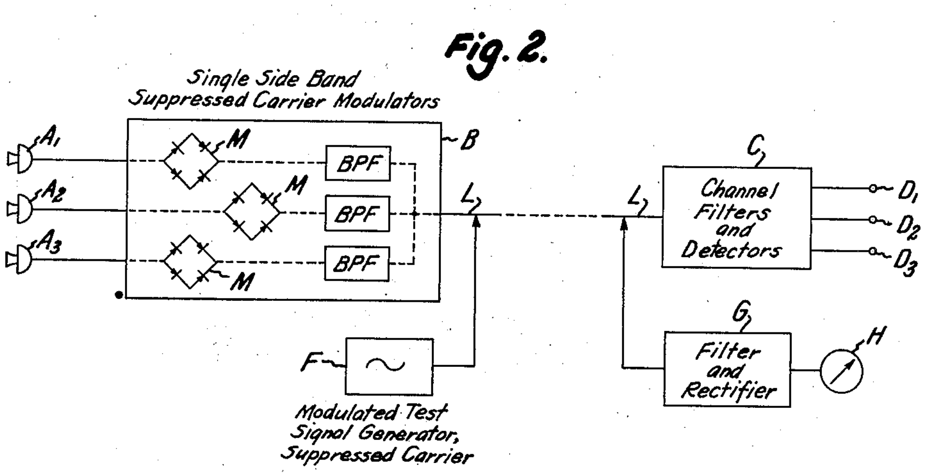
Fig. 2 is a schematic diagram of the carrier wave system.

Figure 2 shows in diagrammatic form a communication system incorporating a testing means according to the invention. The message sources, for example microphones $A_1$, $A_2$, $A_3$ pertaining to the individual circuits, are related to a carrier wave terminal equipment B of any well known type and including, for each message channel, a balanced modulator for generating a double sideband wave with the carrier suppressed and a filter for suppressing one of the side bands. Balanced modulators are described, for example, in Radio Engineer's Handbook, F. E. Terman, McGraw-Hill Book Company, 1943 edition, pages 551 to 553, and for simplicity of schematic illustration, modulators M of copper oxide ring type are indicated as components of the terminal equipment B. Only the upper side band of each channel is transmitted through the associated band pass filter BPF and over line L to the distant terminal equipment C; this latter terminal feeds individual circuit equipments $D_1$, $D_2$, $D_3$ in known manner.

For test purposes, a signal source F applies to line L a modulated carrier wave signal, the frequency of which is chosen as described above and, at the distant terminal, the test signal is selected and amplified if necessary and demodulated by suitable means at G and applied to an indicating or measuring device at H.

The voltage which is developed by the apparatus at G for measurement or control purposes may be derived from the side bands only of the test signal. In this case, the amplitude of the carrier of the test signal obviously has no effect upon the voltage developed, and the presence or absence of carrier leak is equally without effect. The measurement or control is thereby completely immune from carrier leak, and it is not necessary that the carrier of the test signal be transmitted.

The measurement or control voltage may be obtained by the apparatus at G by rectifying or otherwise deriving from the test signal its alternating current envelope function. In this case, the measurement or control is substantially independent of the carrier leak, but there is a small residual error. The error depends to a small degree on the depth of modulation of the test signal.

Figure 3:
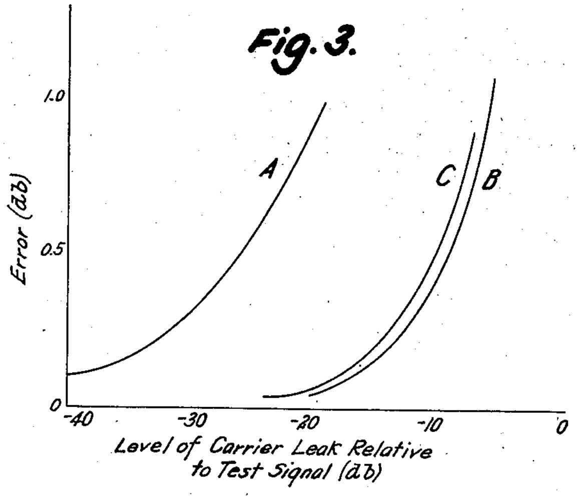
Fig. 3 is a curve sheet showing the maximum measurement error at various levels of carrier leak for measurements with an unmodulated test signal and with test signals of different degrees of modulation.

In Figure 3 of the accompanying drawing is illustrated the improvement which can be obtained in this case with the present invention; this figure shows the maximum measurement error in decibels with various levels of carrier leak measured in decibels relative to the test signal. This figure also shows for comparison purposes the maximum error of a system in which an unmodulated test signal is used, the curve of this system being indicated at A. The test signal is assumed to be exactly of carrier frequency and the error then depends upon the phase difference between the test signal and the leak signal. With no modulation, as with curve A, the error is a maximum when the signals are exactly in phase or out of phase.

Curve B in Figure 3 indicates the corresponding error when a 20% modulated test signal is used, measurement or control being made on the alternating current envelope. Maximum error occurs when the carrier leak signal is in phase quadrature with the carrier of the test signal. Curve C is for the same conditions as curve B, but using a 50% modulated signal. Comparison of curves B and C with curve A shows that the modulation method, even when using simple rectification of the modulated test signal, can tolerate approximately 15 decibels higher carrier leak than when the unmodulated test signal is used.

Figure 4:
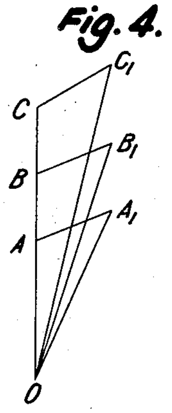
Fig. 4 is a vector diagram illustrating a semi-graphical solution of the problem of determining the relationship between the error and the amplitude and phases of the carrier leak.

It has not been found feasible to obtain a direct analytical relationship between the error and the amplitude and phase of the leak; but the relation can be worked out by a semi-graphical method, using the diagram shown in Figure 4. In this figure, the amplitude modulated test signal is represented by the vector OB oscillating between amplitudes OA and OC, where BA and BC are equal and represent the modulation component. The carrier leak is then added vectorially at points A, B and C by a component AA', BB' or CC' having a phase angle of $\theta$ to the carrier OB (or OA or OC) of the test signal. The resultant signal of carrier frequency is then represented by OA', OB' or OC'; these amplitudes can be calculated for various values of depth of modulation of the test signal, as measured by AB/OB, for various values of leak as measured by AA'/OB and for various values of phase angle as measured by the angle $\theta$. The effect of the leak is in all cases effectively to reduce the amplitude of the modulation.

We claim:

1. A multiple channel communication system of the type including a transmitting station with carrier suppression single side band modulators for transposing messages to bands of frequencies in channels at one side of and spaced from the carrier frequencies of the individual modulators, a receiving station connected to said transmitting station through a channel common to all of said modulators, said receiving station including band-pass filters for separating the bands of frequencies from each other, and means for measuring the transmission characteristics of the common channel; characterized by the fact that said measuring means includes carrier suppression modulator means at the transmitting station for imposing on said common channel a modulated test signal in a frequency range outside of the frequency ranges of said channels, the carrier frequency of the modulated test signal being the same as the carrier frequency of one of said modulators, means at the receiving station for demodulating said modulated test signal, and means responsive to the resulting demodulated voltage.

2. A multiple channel communication system as recited in claim 1, wherein the frequency range of the modulated test signal falls between the frequency ranges of two adjacent channels.

3. In the operation of a multi-channel suppressed-carrier single-side band telephony system in which the frequency spectrum of each message transmission channel is spaced from its suppressed carrier frequency by a frequency gap; a process of measuring the transmission characteristics of the system for test or control purposes and without withdrawing any message channel from service, said process comprising the steps of transmitting over the system a modulated carrier frequency test signal in a frequency band within one of the inter-channel frequency gaps, filtering the transmitted test signal from the message signals transmitted over the several message channels, and demodulating the filtered-out test signal to obtain a voltage significant of the transmission characteristic.

4. The invention as recited in claim 3, in combination with the step of suppressing the carrier frequency of said modulated test signal.

FREDERICK JOHN DUNN TAYLOR.
DAVID GORDON TUCKER.

REFERENCES CITED

The following references are of record in the file of this patent:

UNITED STATES PATENTS

| Number | Name | Date |
|---|---|---|
| 2,194,935 | Getaz | Mar. 26, 1940 |
| 2,379,744 | Pfleger | July 3, 1945 |